US008230879B2

(12) United States Patent
Kleegrewe et al.

(10) Patent No.: US 8,230,879 B2
(45) Date of Patent: Jul. 31, 2012

(54) ACTUATING DRIVE WITH A POSITION TRANSMITTER

(75) Inventors: Thomas Kleegrewe, Minden (DE); Axel Bredemeyer, Minden (DE); Manfred Klüppel, Rehburg-Loccum (DE)

(73) Assignee: ABB AG, Mannheim (DE)

( * ) Notice: Subject to any disclaimer, the term of this patent is extended or adjusted under 35 U.S.C. 154(b) by 782 days.

(21) Appl. No.: 12/328,229

(22) Filed: Dec. 4, 2008

(65) Prior Publication Data

US 2009/0145499 A1 Jun. 11, 2009

(30) Foreign Application Priority Data

Dec. 6, 2007 (DE) ........................ 10 2007 058 778

(51) Int. Cl.
*F16K 37/00* (2006.01)
*F17D 3/01* (2006.01)
*G12B 13/00* (2006.01)

(52) U.S. Cl. .......................... 137/554; 137/556; 73/1.75

(58) Field of Classification Search .................. 137/553, 137/554, 556, 556.3; 73/1.72
See application file for complete search history.

(56) References Cited

U.S. PATENT DOCUMENTS

| | | | | |
|---|---|---|---|---|
| 450,451 | A * | 4/1891 | Ferrell | 116/277 |
| 4,402,209 | A * | 9/1983 | Di Domenico | 73/317 |
| 4,877,059 | A * | 10/1989 | Popescu et al. | 137/637.1 |
| 5,523,636 | A * | 6/1996 | Nelson | 310/103 |
| 5,900,930 | A * | 5/1999 | Simon et al. | 356/138 |
| 6,695,282 | B2 * | 2/2004 | Clemens et al. | 251/129.04 |
| 6,976,503 | B2 * | 12/2005 | Ens et al. | 137/552 |

* cited by examiner

*Primary Examiner* — Craig Schneider
*Assistant Examiner* — Atif Chaudry
(74) *Attorney, Agent, or Firm* — Buchanan Ingersoll & Rooney PC

(57) ABSTRACT

The disclosure relates to an actuating drive having a position transmitter for control of an actuating element with a position in a process installation. The position transmitter is equipped with a rotary measurement system whose pivoting range is mechanically limited, with the rotary measurement system having a shaft which is connected to a pick-up lever in an interlocking and unconfusable manner, which pick-up lever is articulated by means of the actuating drive or the actuating element. The shaft and the rotary measurement system are connected to one another via a slipping clutch. Markings are arranged isoazimuthally with respect to the rotation axis of the shaft, on the shaft circumference, and include angle information about the angle of the marking position with respect to the pick-up lever. The digital position transmitter has a sensor system for identification and evaluation of the markings. The slipping clutch has hysteresis.

4 Claims, 3 Drawing Sheets

ACTUATING DRIVE WITH A POSITION TRANSMITTER

RELATED APPLICATION

This application claims priority under 35 U.S.C. §119 to German Patent Application No. DE 10 2007 058 778.5 filed in Germany on Dec. 6, 2007, the entire content of which is hereby incorporated by reference in its entirety.

TECHNICAL FIELD

An actuating drive is disclosed having a position transmitter for control of an actuating element with a positioner in a process installation.

BACKGROUND INFORMATION

The expression “digital position transmitter” used in this disclosure relates to a system which controls one or more output signals corresponding to a plurality of input signals. Some of the input signals represent a static or dynamic set state while others of the input signals characterize a static or dynamic actual state. The output signals are used to make the actual state match the set state. The algorithm for this purpose is implemented in software in a microcontroller. In general, the output signals—with or without the use of auxiliary power—control the position of an actuating element.

(Digital) position transmitters such as these have a position feedback sensor system which detects movements and positions of the connected actuating element. The position feedback of the known (digital) position transmitter is designed such that a shaft transmits the movements and positions of the actuating element to a rotary measurement system, for example a potentiometer. Depending on the technology that is used, the measurement range of the rotary measurement system is restricted to an angle of <120° or <270°.

Actuating drives are divided into pivoting drives and linear drives. In the case of a linear drive, the linear movement of the output drive of the actuating drive is transmitted directly to a linearly operated actuating member. In this case, a pick-up lever converts the linear movement of the push rod of the actuating element to a rotation which is transmitted directly to the shaft. The shaft has a flat on one side. The shaft holder in the pick-up lever is designed such that the pick-up lever is mounted on the shaft in an unambiguous interlocking manner. The design of the mechanical fitting of the digital position transmitter to the actuating element ensures that the position transmitter is mounted at an angle of 90°, transversely with respect to the push rod.

In contrast, in the case of a pivoting drive, the linear movement of the output drive of the actuating drive is converted by suitable means to a rotary movement. In this case, an adapter connects the shaft directly to the pivoting drive.

These known arrangements are standardized by the Standards DIN/IEC 534 and VDI/VDE 3845.

In the known position feedback sensor system with a rotary measurement system for a linear drive, the measured value that is fed back is a trigonometric function of the position in the control range, whose parameters depend on the initial value of the position on set up and the effective lever arm lengths on the push rod of the actuating element and of the pick-up lever. For a positioning behavior which is as accurate as possible, the measured value which is fed back is linearized corresponding to the actual position of the actuating element in the control range. To this end, the software of the digital position transmitter implements a linearization algorithm. In this case, it is necessary to know the position in which the pick-up lever is at right angles to the push rod of the drive.

In order to ensure the commercially required linearity of the positioning behavior, the described design of the position feedback requires the digital position transmitter to linearize the detected pivoting movement in the case of linear drives.

It is known for the digital pneumatic position transmitter to implement a function which specifically moves the connected actuating element by means of self-generated output signals, and thus carries out auto-calibration. In this case, auto-calibration means a function in which the digital position transmitter automatically sets the upper and lower limits of the operating range of the actuating element.

The fitting mechanism and the costs of appropriately high-resolution measurement technology have led to the pivoting range for fitting of linear drives being restricted to an angle of 30° to 60°. Because of the restricted measurement range of the rotary measurement system the pivoting range of the shaft for digital position transmitters is restricted to a defined circular segment relative to the housing geometry of the digital position transmitter. This leads to errors in fitting the digital position transmitter to the drive and actuating element when the resultant pivoting range leaves the permissible circular segment. This problem applies to pivoting and linear drives.

Furthermore, it is known for digital position transmitters to be equipped with a slipping clutch between the measurement system and the shaft. The pivoting range angle is admittedly still limited, but the pivoting range is not defined with respect to the housing geometry. In order to ensure that the digital position transmitter still achieves the linearity required commercially for linear drives, the position of the shaft at which the pick-up lever is at right angles to the push rod must however in this case be “signaled” in some suitable manner to the digital position transmitter.

SUMMARY

A means is disclosed for auto-calibration of a position transmitter with a rotary measurement system that is suitable for any desired linear actuating drives and allows precise linearization of the fed-back measured values.

An actuating drive is disclosed having a position transmitter for control of an actuating element with the position transmitter being equipped with a rotary measurement system whose pivoting range is mechanically limited, with the rotary measurement system having a shaft which is connected to a pick-up lever in an interlocking and unconfusable manner, which pick-up lever is articulated by means of the actuating drive or the actuating element, and with the shaft and the rotary measurement system being connected to one another via a slipping clutch, wherein markings are arranged isoazimuthally with respect to the rotation axis of the shaft, on the shaft circumference, and include angle information about the angle of the marking position with respect to the pick-up lever, the digital position transmitter has a sensor system for identification and evaluation of the markings, and the slipping clutch has hysteresis.

In another aspect, an arrangement is disclosed to control an actuating element in a process installation. Such an arrangement comprises an actuating drive; a position transmitter; a rotary measurement system whose pivoting range is mechanically limited; a shaft configured with the rotary measurement system; a pick up lever interlockingly connected with the shaft, which pick up lever is articulated based on at least one of the actuating drive and the actuating element; and a slipping clutch which connects the shaft and the rotary measurement system, wherein markings are arranged isoazimuthally with respect to a rotation axis of the shaft, on a shaft circumference, and wherein the digital position transmitter has a sensor system for identification and evaluation of the markings.

BRIEF DESCRIPTION OF THE DRAWINGS

Further details and advantages of the disclosure will be explained in more detail in the following text with reference to one exemplary embodiment. In the drawings which are required for this purpose.

DETAILED DESCRIPTION

The disclosure is based on a linear actuating drive having a position transmitter for control of an actuating element, with the position transmitter being equipped with a rotary measurement system. The rotary measurement system has a shaft which is connected to a pick-up lever in an interlocking and unconfusable manner, which pick-up lever is articulated by means of the actuating drive or the actuating element. The pivoting range of the measurement system is mechanically limited. The shaft and the rotary measurement system are connected to one another via a slipping clutch.

According to the disclosure, markings are arranged on the shaft circumference on the shaft and include angle information about the angle of the marking position with respect to the pick-up lever. The markings are arranged isoazimuthally with respect to the rotation axis of the shaft.

The digital position transmitter has a sensor system for identification and evaluation of the markings.

The slipping clutch has hysteresis.

For auto-calibration of the digital position transmitter, the sensor system is switched on in order to identify and decode the markings. When the pick-up lever pivots beyond the azimuthal distance between two adjacent markings, at least one of the markings is crossed over. The first identified marking is used to determine a correction value through which the slipping clutch has rotated the rotary measurement system with respect to the shaft. This correction value is taken into account in the linearization algorithm.

The disclosure advantageously allows pivoting drives to be mounted at any desired angle with respect to the position transmitter since the slipping clutch means that the restricted angle range of the measurement system is no longer relevant.

Furthermore, linear drives can then themselves be positioned with the commercially required linearity when the slipping clutch has rotated the measurement system with respect to the shaft.

Figure 1:
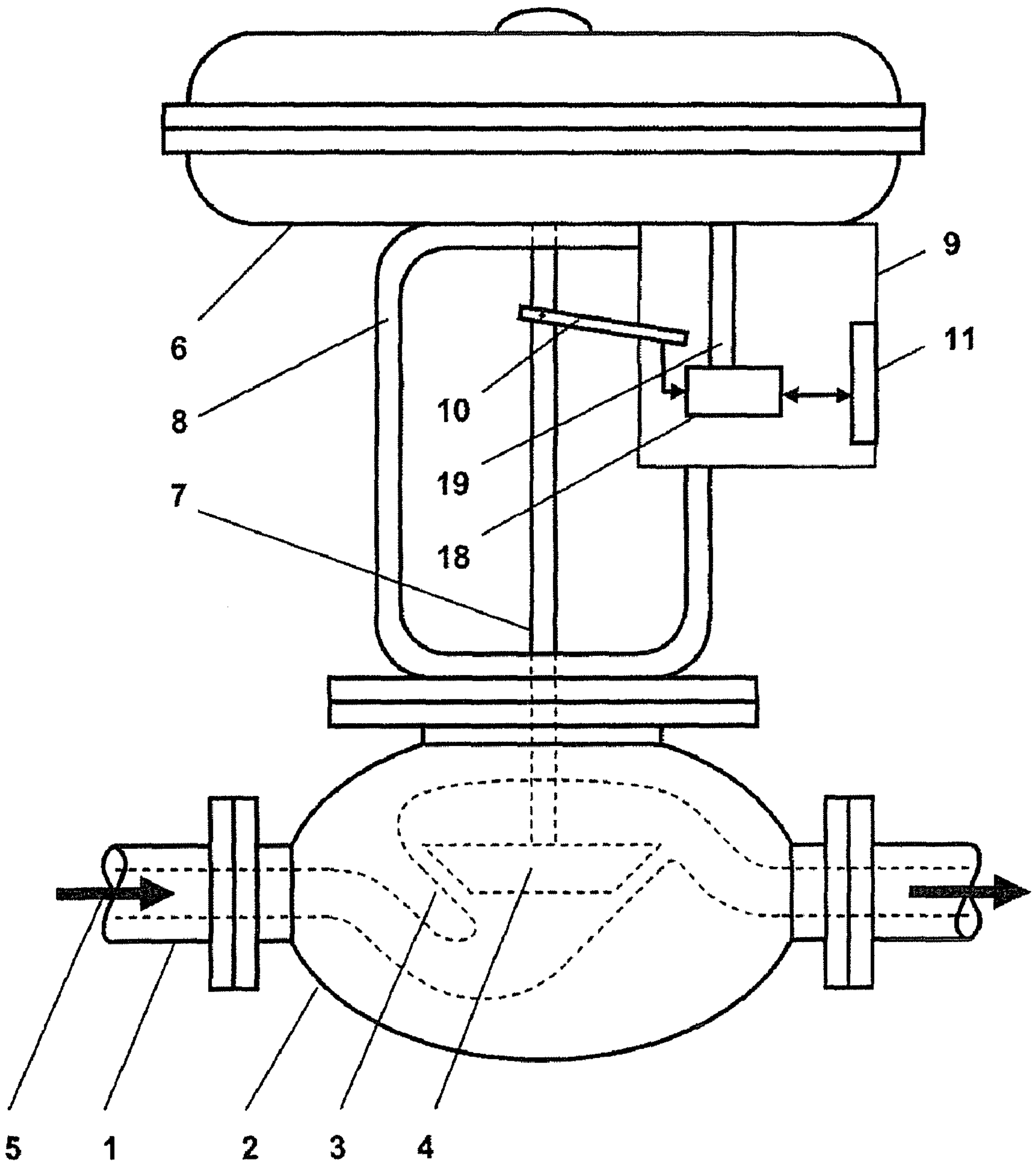
FIG. 1 shows an outline illustration of an exemplary actuating drive, in the form of a linear drive, on a process valve.

In FIG. 1, a pipeline 1, a fragment of which is indicated, of a process installation which is not illustrated any further has a process valve 2 installed in it, as an actuating member. In its interior, the process valve 2 has a closure body 4, which interacts with a valve seat 3, in order to control the amount of process medium 5 passing through. The closure body 4 is operated linearly via a valve rod 7 by a pneumatic actuating drive 6. The actuating drive 6 is connected to the process valve 2 via a yoke 8. A digital position transmitter 9 is fitted to the yoke 8. The travel of the valve rod 7 is signaled to the position transmitter 9 via a position sensor 10. The detected travel is compared in control electronics 18 with the set value supplied via a communication interface 11, and the actuating drive 6 is operated as a function of the determined control error. The control electronics 18 of the position transmitter 9 operate an I/P converter for conversion of an electrical control error to an adequate control pressure. The I/P converter of the position transmitter 9 is connected to the actuating drive 6 via a pressure-medium supply 19.

In order to set up the process valve 2, the position transmitter 9 is mechanically connected to the actuating drive 6, and the electrical and pneumatic connections are connected. The position sensor 10 is mounted such that it can rotate about a shaft 13 and is connected in an articulated manner to the valve rod 7 close to its free end. For this purpose, the position sensor 10 is positioned at right angles to the valve rod 7 when it is being fitted. The shaft 13 is operatively connected to a rotary measurement system.

Figures 2A, 2B:
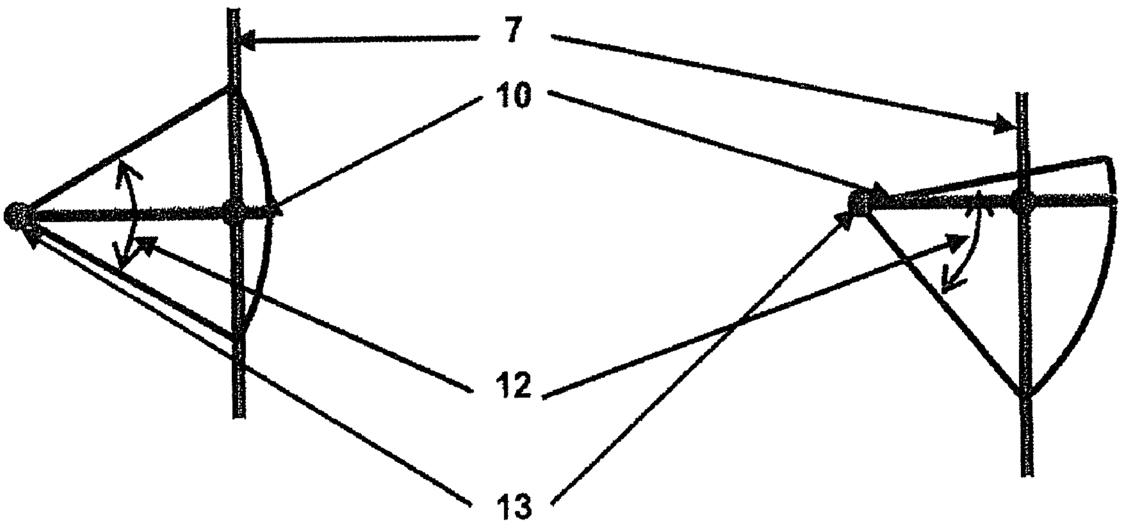
FIG. 2*a* shows an outline illustration of an exemplary position feedback sensor system as a function of the initial point of action based on a mid-positioned valve rod.
FIG. 2*b* shows an outline illustration of an exemplary position feedback sensor system as a function of the initial point of action based on a position of the valve rod which corresponds to a process valve being virtually closed.
Figure 3:
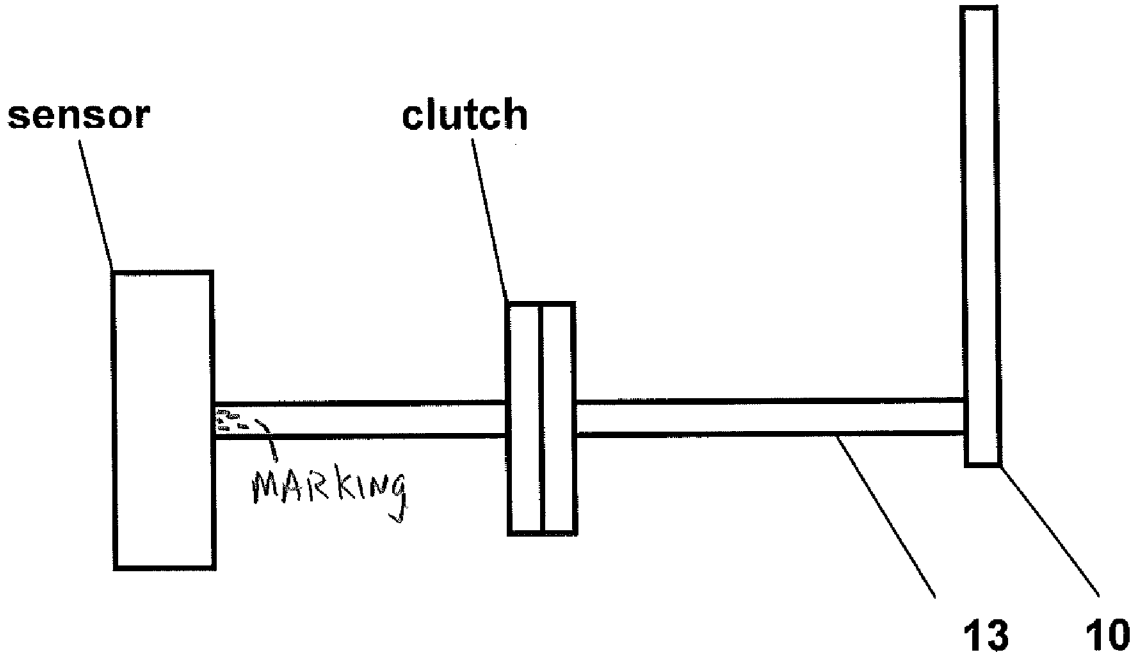
FIG. 3 shows an outline illustration of an exemplary position feedback sensor system having a rotary measurement system.

At the time of fitting, the actual position of the valve rod 7 with respect to the position transmitter 9 and its position sensor 10 is completely undefined. This relationship is shown in the form of an illustration in FIGS. 2 and 3. While FIG. 2*a* is based on a mid-position of the valve rod 7, which corresponds to the process valve 2 being half-open, during the fitting of the position sensor 10 on the valve rod 7, FIG. 2*b* uses the same reference symbols for the same items to show a position of the valve rod 7 which corresponds to a process valve 2 being virtually closed. Depending on the initial point of action of the position sensor 10 on the valve rod 7, the pivoting angle 12 which corresponds to the linear movement of the actuating drive 6 is in fact symmetrical, as shown in FIG. 2*a*, or highly one-sided as shown in FIG. 2*b*, with respect to the initial position. As a result of the trigonometric relationship mentioned initially, this results in different correction requirements for the measured position signal with respect to the actual position of the valve rod 7 in the control range.

According to the disclosure, markings are arranged isoazimuthally with respect to the rotation axis of the shaft 13 and include angle information about the angle of the marking position with respect to the position sensor 10. The digital position transmitter 9 has a sensor system for identification and evaluation of the markings. Furthermore, the slipping clutch has hysteresis.

During the auto-calibration of the digital position transmitter 9, the sensor system is switched on in order to identify and to decode the markings. When the pick-up lever pivots beyond the azimuthal distance between two adjacent markings, at least one of the markings is crossed over. Depending on the initial position of the position sensor 10 on the valve rod 7 with respect to the shaft 13, the slipping clutch is operated in this case. Its hysteresis results in reliable positioning of the shaft 13 with respect to the valve rod 7 at a value in the permissible value range of the sensor system.

The first identified marking is used to determine a correction value through which the slipping clutch has rotated the rotary measurement system with respect to the shaft. This correction value is taken into account in the linearization algorithm.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Process valve
3 Valve seat
4 Closure body
5 Process medium
6 Actuating drive
7 Valve rod
8 Yoke
9 Position transmitter
10 Position sensor
11 Communication interface
12 Pivoting angle
13 Shaft
18 Control electronics
19 Pressure-medium supply

The invention claimed is:

1. An actuating drive comprising:

a position transmitter for control of an actuating element having a rotary measurement system whose pivoting range is mechanically limited, wherein the rotary measurement system has a shaft which is connected to a pick-up lever in an interlocking manner, wherein the pick-up lever is articulated by means of the actuating drive or the actuating element acting on the shaft, and the shaft and the rotary measurement system being connected to one another via a slipping clutch; and a digital position transmitter having a sensor system for identification and evaluation of markings, wherein the markings are arranged isoazimuthally with respect to a rotation axis of the shaft, on a shaft circumference, and include angle information about a respective angle of a marking position with respect to the pick-up lever, and wherein the slipping clutch has hysteresis.

2. An arrangement to control an actuating element in a process installation, comprising:

an actuating drive;

a position transmitter;

a rotary measurement system whose pivoting range is mechanically limited;

a shaft configured with the rotary measurement system;

a pick up lever interlockingly connected with the shaft, which pick up lever is articulated based on at least one of the actuating drive and the actuating element;

a slipping clutch which connects the shaft and the rotary measurement system; and a digital position transmitter having a sensor system for identification and evaluation of markings, wherein the markings are arranged isoazimuthally with respect to a rotation axis of the shaft, on a shaft circumference.

3. The arrangement accordingly to claim 2, wherein the markings include angle information about a respective angle of a marking position with respect to the pick up lever.

4. The arrangement accordingly to claim 2, wherein the slipping clutch has hysteresis.

* * * * *